United States Patent
Tomiyama et al.

(10) Patent No.: US 9,034,935 B2
(45) Date of Patent: May 19, 2015

(54) URETHANE FOAM MOLDED PRODUCT AND METHOD FOR PRODUCING THE SAME

(75) Inventors: Koji Tomiyama, Ichinomiya (JP); Naoki Katayama, Nagoya (JP); Yasuo Suzuki, Komaki (JP); Shinji Yoshida, Kasugai (JP); Katsutoshi Hashimoto, Kani (JP)

(73) Assignees: SUMITOMO RIKO COMPANY LIMITED, Komaki-shi (JP); TOKAI CHEMICAL INDUSTRIAS, LTD., Kani-gun (JP)

(*) Notice: Subject to any disclaimer, the term of this patent is extended or adjusted under 35 U.S.C. 154(b) by 748 days.

(21) Appl. No.: 13/203,176

(22) PCT Filed: Mar. 24, 2011

(86) PCT No.: PCT/JP2011/057192
§ 371 (c)(1),
(2), (4) Date: Aug. 24, 2011

(87) PCT Pub. No.: WO2011/122441
PCT Pub. Date: Oct. 6, 2011

(65) Prior Publication Data
US 2013/0001460 A1 Jan. 3, 2013

(30) Foreign Application Priority Data

Mar. 30, 2010 (JP) ................................. 2010-078503
Aug. 31, 2010 (JP) ................................. 2010-194130

(51) Int. Cl.
| | |
|---|---|
| C08G 18/06 | (2006.01) |
| C08G 18/32 | (2006.01) |
| C08G 18/48 | (2006.01) |
| C08G 18/66 | (2006.01) |
| C08G 18/76 | (2006.01) |
| C08G 101/00 | (2006.01) |

(52) U.S. Cl.
CPC ........ *C08G 18/7671* (2013.01); *C08G 18/3206* (2013.01); *C08G 18/4829* (2013.01); *C08G 18/6674* (2013.01); *C08G 2101/0083* (2013.01)

(58) Field of Classification Search
CPC .................. B29C 44/3403; B29K 2995/0008; C08G 18/4829; C08G 2101/00083; C08J 2375/04; C08J 9/0066
USPC ........................................... 521/99, 123, 170
See application file for complete search history.

(56) References Cited

U.S. PATENT DOCUMENTS

2009/0057603 A1* 3/2009 Tomiyama et al. ........ 252/62.54

FOREIGN PATENT DOCUMENTS

| | | |
|---|---|---|
| DE | 3616507 C1 | 7/1987 |
| JP | 2003-097645 A | 4/2003 |
| JP | 2003-321554 A | 11/2003 |
| JP | 2006-219562 A | 8/2006 |
| JP | 2007-044919 A | 2/2007 |
| JP | 2007-230544 A | 9/2007 |
| JP | 2009-051148 A | 3/2009 |
| WO | 2008/104491 A1 | 9/2008 |

OTHER PUBLICATIONS

Notification of Transmittal of Translation of the International Preliminary Report on Patentabililty (Form PCT/IB/338) of International Application No. PCT/JP2011/057192 mailed Nov. 1, 2012 with Forms PCT/IB/373 and PCT/ISA/237.
German Office Action dated Feb. 18, 2013, issued in corresponding German Patent Application No. 11 2011 100 007.3; with English translation (8 pages).
International Search Report for PCT/JP2011/057192, mailing date of May 10, 2011.
Chinese Office Action dated Aug. 5, 2013, issued in corresponding Chinese Patent Application No. 201180001301.0, w/ English translation.
"Magnetic Functional Materials", Chief Editor: Guangfei Sun and Wenjiang Qiang, Published by Chemical Industry Press, Feb. 2007, Beijing, pp. 428-431, Cited in CN Office Action dated Nov. 4, 2014.
Office Action dated Nov. 4, 2014, issued in corresponding Chinese Patent Application No. 201180001301.0, with English Translation (12 pages).

* cited by examiner

*Primary Examiner* — John Cooney
(74) *Attorney, Agent, or Firm* — Westerman, Hattori, Daniels & Adrian, LLP (57) ABSTRACT

The present invention provides a urethane foam molded product that has high thermal conductivity with minimal change to its physical properties. A simple method for producing the same is also provided. The urethane foam molded product includes a base material formed of a polyurethane foam, and a thermal conductive filler mixed in the base material and oriented to form mutual connections. The thermal conductive filler is formed of composite particles that include thermal conductive particles formed of a nonmagnetic material, and magnetic particles adhered to the surfaces of the thermal conductive particles. The method for producing the urethane foam molded product includes a raw material mixing process that mixes a foam urethane resin material and the thermal conductive filler to obtain a mixed raw material, and a foam molding process that injects the mixed raw material into a cavity of a foaming die and performs foam molding while a magnetic field is applied so as to substantially uniform a magnetic flux density inside the cavity.

13 Claims, 6 Drawing Sheets

FIG. 7 urethane foam molded product and method for producing the same

TECHNICAL FIELD

The present invention relates to a urethane foam molded product that is used as, for example, a sound absorbing material or a vibration dampening material, and a method for producing the same.

BACKGROUND ART

Urethane foam molded products are used in the automotive and various other fields as sound absorbing materials, vibration dampening materials, and the like (see, for example, Patent Documents 1). A urethane foam molded product has a large number of cells (bubbles) therein. Therefore, the urethane foam molded product has low thermal conductivity. For this reason, when the urethane foam molded product is disposed around a heat-generating engine, motor or the like, heat accumulates in the urethane foam molded product and may lead to an increase in the temperature of the engine, motor, or the like. To solve this problem, the heat dissipation property of the urethane foam molded product must be improved. For example, Patent Documents 2 and 3 describe urethane foam molded products having oriented magnetic particles.

PRIOR ART DOCUMENTS

Patent Documents

Patent Document 1: Japanese Patent Application Publication No. JP-A-2003-97645
Patent Document 2: Japanese Patent Application Publication No. JP-A-2007-230544
Patent Document 3: Japanese Patent Application Publication No. JP-A-2009-51148
Patent Document 4: Japanese Patent Application Publication No. JP-A-2006-219562
Patent Document 5: Japanese Patent Application Publication No. JP-A-2007-44919

SUMMARY OF THE INVENTION

Problem to be Solved by the Invention

According to the urethane foam molded products described in Patent Documents 2 and 3, magnetic particles are oriented in a mutually connected state within urethane foam, which forms a heat transfer path in the direction of orientation of the magnetic particles. Thus, the heat dissipation property of the urethane foam molded product can be improved. The urethane foam molded products of Patent Documents 2 and 3 utilize the orientation of magnetic particles in a magnet field. Therefore, iron, stainless steel, or the like having an excellent magnetization property is used for the magnetic particles. However, iron and stainless steel have low thermal conductivity. For this reason, an effect of an improved heat dissipation property is small despite orienting the magnetic particles.

Meanwhile, from the standpoint of improving thermal conductivity, the urethane foam molded product may also include a filler with high thermal conductivity. Fillers with high thermal conductivity include, for example, carbon fiber. However, simply mixing the carbon fiber to form mutual connections and create a heat transfer path is difficult. For example, mixing a large amount of carbon fiber to create a heat transfer path may have an adverse effect on foam molding, and diminish sound absorption and other physical properties. It also poses problems such as increasing the mass of the urethane foam molded product and higher costs. In addition, carbon fiber is a nonmagnetic material. Accordingly, even if foam molding is performed in a magnetic field as when orienting the magnetic particles, the carbon fiber cannot be oriented.

The present invention was devised in light of the foregoing circumstances, and it is an object of the present invention to provide a urethane foam molded product that has high thermal conductivity with minimal change to its physical properties. It is a further object of the present invention to provide a method for producing the same.

Means for Solving the Problem (1) In order to solve the above problem, a urethane foam molded product of the present invention is characterized by including a base material formed of a polyurethane, and a thermal conductive filler mixed in the base material and oriented to form mutual connections, wherein the thermal conductive filler is formed of a composite particle, the composite particle including a thermal conductive particle formed of a nonmagnetic material, and a magnetic particle adhered to a surface of the thermal conductive particle.

The thermal conductive filler is formed of the composite particle that includes the thermal conductive particle and the magnetic particle. The thermal conductive particle that is the core of the composite particle has high thermal conductivity and is formed of a nonmagnetic material. However, the magnetic particle is adhered to the surface of the thermal conductive particle. Therefore, when a magnetic field is applied during foam molding, the magnetic particle tends to orient itself along magnetic field lines. Thus, the composite particle becomes oriented along the magnetic field lines. In other words, the thermal conductive particle can be oriented by utilizing the magnetic field orientation of the magnetic particle adhered to its surface.

As a consequence, the composite particles (thermal conductive filler) are arranged in the base material in a state of mutual connection. This forms a heat transfer path in the base material. That is, heat applied to one end of the urethane foam molded product of the present invention is transferred to the other end in the direction of orientation through the thermal conductive filler, and promptly discharged from the other end. Thus, the urethane foam molded product of the present invention has excellent thermal conductivity. Therefore, according to the urethane foam molded product of the present invention, a temperature increase of a heat-generating sound absorption target can be effectively suppressed.

For example, when orienting magnetic particles in a non-foaming resin or rubber, it is difficult to realize a desired oriented state because of thermal contraction of the resin or rubber during molding and thermal fluctuation of the resin or rubber during thermosetting. On this point, according to the urethane foam molded product of the present invention, a liquid foam urethane resin material grows by foaming during a production process. Therefore, when the thermal conductive filler is oriented in the direction in which the foam urethane resin material grows, both the growth of the foam urethane resin material and the movement of the thermal conductive filler are promoted, which facilitates the achievement of a desired oriented state.

Orienting the thermal conductive filler has little influence on the framework formation of the polyurethane foam. That is, the cell structure of the urethane foam molded product is not prone to change. Further, compared to orienting magnetic particles with low thermal conductivity, thermal conductivity can be improved by using a smaller amount of filler. Therefore, physical properties of the urethane foam molded product such as tensile strength, elongation, and sound absorption are less susceptible to change. Moreover, reducing the mixing amount of filler can achieve a urethane foam molded product that has a lighter weight and lower cost.

Note that, in the urethane foam molded product of the present invention, the thermal conductive filler in the base material is not limited provided that the thermal conductive filler has a certain regularity and is arranged in a prescribed direction. For example, the thermal conductive filler may be arranged in a linear configuration or a curved configuration between the one end and the other end of the urethane foam molded product (and the other end may not necessarily be facing the one end at a 180-degree angle). In addition, the thermal conductive filler may be arranged in a radial configuration that heads from a center toward an outer periphery.

(2) A method for producing a urethane foam molded product according to the present invention is a method for producing the urethane foam molded product as configured in (1) above, and characterized by including: a raw material mixing process that mixes a foam urethane resin material and a thermal conductive filler to obtain a mixed raw material; and a foam molding process that injects the mixed raw material into a cavity of a foaming die and performs foam molding while a magnetic field is applied so as to substantially uniform a magnetic flux density inside the cavity.

According to the production method of the present invention, the thermal conductive filler is oriented by a magnetic field to produce the urethane foam molded product. In the foam molding process, foam molding is performed while there is a magnetic field with a substantially uniform magnetic flux density inside the cavity. Thus, unevenly distributing of the thermal conductive filler caused by a difference in the magnetic flux density can be suppressed and a desired oriented state can be achieved. In addition, even with a relatively small mixing amount of thermal conductive filler, the thermal conductive filler can be oriented in a substantially uniform state of dispersion. Therefore, according to the production method of the present invention, even with a relatively small mixing amount of thermal conductive filler, the urethane foam molded product of the present invention described above that has high thermal conductivity can be easily produced.

Advantageous Effects of the Invention

According to the present invention, a urethane foam molded product can be provided that has improved thermal conductivity without losing inherent physical properties of the urethane foam molded product. A simple method for producing the same can also be provided.

DESCRIPTION OF THE REFERENCE NUMERALS

1: First magnetic induction foam molding device
2U, 2D: Electromagnet portion; 20U, 20D: Core portion; 21U, 21D: Coil portion; 210U, 210D: Conductor; 3: Yoke portion; 4: Foaming die; 40U: Upper die; 40D: Lower die; 41: Cavity
5: Second magnetic induction foam molding device
6: Mount; 61: Bracket; 7: Electromagnet portion; 70D, 70U: Yoke portion; 71L, 71R: Coil portion; 72D, 72U: Pole piece; 710L, 710R: Core portion; 711L, 711R: Conductor; 8: Foaming die; 80U: Upper die; 80D: Lower die; 81: Cavity
L: Magnetic field line

DESCRIPTION OF EMBODIMENTS

Hereinafter, embodiments of a urethane foam molded product and a method for producing the same according to the present invention will be described. However, the urethane foam molded product and the method for producing the same according to the present invention are not limited to the embodiments described below, and may be practiced in various modes that have been modified or improved by one skilled in the art without departing from the scope of the invention.

<Urethane Foam Molded Product>

A urethane foam molded product according to the present invention includes a base material formed of a polyurethane foam, and a thermal conductive filler mixed with the base material and oriented to form mutual connections.

The polyurethane foam is produced from a foam urethane resin material that includes a polyisocyanate component and a polyol component. The polyurethane foam will be explained in more detail in the description of the method for producing the urethane foam molded product of the present invention below.

The thermal conductive filler is formed of composite particles that include thermal conductive particles formed of a nonmagnetic material, and magnetic particles adhered to the surfaces of the thermal conductive particles.

The thermal conductive particles are not limited in any manner provided that the thermal conductive particles use a nonmagnetic material with high thermal conductivity. In the present specification, diamagnetic and paramagnetic materials other than ferromagnetic and antiferromagnetic materials will be referred to as a nonmagnetic material. The thermal conductivity of the thermal conductive particles is, for example, preferably 200 W/m·K or more. A carbon material such as graphite or carbon fiber, for example, is well suited as the material of the thermal conductive particles. In addition, aluminum, gold, silver, copper, and an alloy that uses these as a base material are also suitable. One particle type or a combination of two or more particle types may be used as the thermal conductive particles.

The thermal conductive particles are not particularly limited in terms of form provided that the thermal conductive particles are capable of forming a compound with magnetic particles. Various forms may be used, including that of a flake, fiber, column, sphere, elliptical sphere, and elongated sphere (a shape in which a pair of opposing hemispheres are connected by a cylinder), for example. If the thermal conductive particles have a form other than spherical depending on the form of the magnetic particles described later, the contact surface area between pairs of composite particles (thermal conductive filler) increases. Thus, a heat transfer path can be more easily secured and a larger amount of heat transferred. Note that metal particles such as aluminum, gold, and copper normally have a spherical form. Therefore, increasing the aspect ratio results in a higher process cost. On the contrary, graphite having a form with a large aspect ratio can be obtained at a relatively low cost. Thus, from this standpoint, graphite is well suited as the material of the thermal conductive particles.

Examples of graphite include natural graphite such as flake graphite, scale graphite and amorphous graphite, as well as artificial graphite. It is difficult to achieve artificial graphite in flake form. Therefore, natural graphite is preferred because of its flake form and a better effect of improved thermal conductivity. Expanded graphite may also be used as the graphite, wherein a material that generates gas when heated is inserted between the layers of flake graphite. As described in Patent Documents 4 and 5, for example, expanded graphite may be used as a flame retardant. When expanded graphite is heated, the generated gas spreads throughout the layers and forms a layer that is stable with respect to heat and chemicals. The thus formed layer becomes a heat insulating layer that achieves a flame retardant effect by suppressing the transfer of heat.

A flame-retardant urethane foam molded product normally has a dropping effect that suppresses the spread of fire by causing sparks to drop off even when exposed to fire. However, if the urethane foam molded product includes magnetic particles, the dropping effect is adversely affected and the self-extinguishing property of the urethane foam molded product may also be reduced. In the urethane foam molded product of the present invention, the composite particles (thermal conductive filler) are oriented. Therefore, heat applied to the urethane foam molded product is easily transferred to the thermal conductive particles. Thus, if the thermal conductive particles are formed of expanded graphite, the expansion onset temperature of the expanded graphite is quickly reached. As a consequence, the flame retardant effect of the expanded graphite is promptly exhibited. Accordingly, by using expanded graphite as the thermal conductive particles, it is possible to suppress a reduction in the self-extinguishing property of the urethane foam molded product and maintain its flame retardancy.

If expanded graphite is used as the thermal conductive particles, any commonly known expanded graphite powder may be selected provided that the selected expanded graphite powder is suitable in terms of expansion onset temperature, expansion coefficient, and the like. The expansion onset temperature of the expanded graphite, for example, must be higher than the heating temperature during molding of the urethane foam molded product. Specifically, expanded graphite whose expansion onset temperature is 150 degrees Celsius or more is preferred.

Using only expanded graphite as the thermal conductive particles can improve the flame retardancy of the urethane foam molded product. For example, the urethane foam molded product preferably contains 5 mass % or more of expanded graphite when the total amount of the urethane foam molded product is 100 mass %.

Meanwhile, if the urethane foam molded product contains a large amount of expanded graphite, an acid component between the layers of expanded graphite may interfere with the urethane curing reaction. A reduction in moldability that accompanies an increase in the amount of expanded graphite included can be suppressed by increasing the amount of a catalyst to be mixed with the urethane foam molded product. However, in consideration of the moldability of the urethane foam molded product, when expanded graphite is used as the thermal conductive particles, another nonmagnetic material such as graphite other than expanded graphite is also preferably used in combination. In other words, a preferred mode includes, as composite particles, both composite particles that have magnetic particles adhered to the surfaces of expanded graphite particles, and composite particles that have magnetic particles adhered to the surfaces of particles formed of a nonmagnetic material other than expanded graphite. The mixing ratio of each type of composite particle may be determined as appropriate in consideration of flame retardancy, moldability, and the like.

The size of the thermal conductive particles may be determined in consideration of dispersibility, the equipment used for foam molding, and the like. For example, the average particle size of the thermal conductive particles is preferably 500 μm or less, and more preferably 250 μm or less. Note that, in the present specification, the maximum length of the thermal conductive particles is used as the particle size. Further, as described in detail later, according to the method for producing a urethane foam molded product, the maximum length of the thermal conductive particles is preferably 500 μm or less if an impact stirring method is employed.

The magnetic particles are not particularly limited so long as the magnetic particles have an excellent magnetization property. Suitable particles include those of ferromagnetic material such as iron, nickel, cobalt, gadolinium, stainless steel, magnetite, maghemite, manganese zinc ferrite, barium ferrite, and strontium ferrite, and antiferromagnetic material such as MnO, $Cr_2O_3$, $FeCl_2$, and MnAs, as well as particles of alloys that use these in combination. Among these, iron powder, nickel powder, cobalt powder, and iron-based alloy powder that uses these in combination (including stainless steel) are well-suited from the standpoints of high saturation magnetization and ease of obtaining as fine particles.

The magnetic particles are adhered to the surfaces of the thermal conductive particles and act to orient the composite particles (thermal conductive filler). The magnetic particles may adhere to only parts of the surfaces of the thermal conductive particles, or adhere so as to cover the entire surfaces of the thermal conductive particles. In addition, the size of the magnetic particles may be determined as appropriate in consideration of the size of the thermal conductive particles, the orientation of the composite particles, and the thermal conductivity between composite particles. For example, magnetic particles of a smaller size tend to have less saturation magnetization. Thus, in order to orient the composite particles using a smaller amount of magnetic particles, the average particle size of the magnetic particles must be 100 nm or more, preferably 1 μm or more, and more preferably 5 μm or more. Note that, in the present specification, the maximum length of the magnetic particles is used as the particle size.

The magnetic particles are not particularly limited in terms of form. For example, if the magnetic particles have a flat form, there is a shorter distance between adjacent thermal conductive particles. This improves the thermal conductivity between adjacent composite particles. As a consequence, the urethane foam molded product has improved thermal conductivity. In addition, if the magnetic particles have a flat form, the magnetic particles and thermal conductive particles are in surface contact. That is, the contact surface area of both the magnetic particles and thermal conductive particles increases. This improves adhesion between the magnetic particles and the thermal conductive particles. Accordingly, the magnetic particles are less likely to separate. This also improves thermal conductivity between the magnetic particles and the thermal conductive particles. Based on the reasons given above, flake particles are preferably used as the magnetic particles.

If graphite is used as the thermal conductive particles, the volume ratio between the graphite and the magnetic particles in the composite particles is preferably 7:3 to 5:5 in consideration of orientation of the composite particles and an effect of improved thermal conductivity. If the volume percent of the magnetic particles is less than 30%, their magnetic property may be insufficient for orientation. In addition, if the volume percent of the graphite is less than 50%, the obtained effect of improved thermal conductivity is small.

The composite particles may be produced according to a wet method such as electrostatic adsorption, or a dry method such as pulverization mixing, agitation granulation, mechanochemical, or the like. For example, under the agitation granulation method, a raw material that includes a powder of thermal conductive particles, a powder of magnetic particles, and a binder for adhering the two together is stirred at high speed and granulated. According to the agitation granulation method, the thermal conductive particles and the magnetic particles can be softly adhered by the binder. Therefore, even if the thermal conductive particles have a form with high thermal conductivity (a form with a large aspect ratio), the thermal conductive particles can form a compound with the magnetic particles without losing their shape. Any type of binder may be selected as appropriate in consideration of the types of thermal conductive particles and magnetic particles used, an effect on foam molding, and the like. During production of the composite particles, friction heat may be generated by the high speed stirring. Therefore, a non-volatile binder is preferable. A water-based binder is also preferable in consideration of the environment. Examples of water-based binders include methyl cellulose, carboxymethyl cellulose, hydroxypropylmethyl cellulose, and polyvinyl alcohol.

The insulating property of the urethane foam molded product according to the present invention may be required for use in dissipating heat from an electronic component. For such a requirement, if the composite particles have conductivity, the thermal conductive filler preferably uses composite particles whose surfaces are covered by an insulating layer. The composite particles can have an insulating property without losing a magnetic field orientation by covering the surfaces of the composite particles, that is, the surfaces of the thermal conductive particles and magnetic particles, with an insulating layer.

Examples of material for the insulating layer include epoxy resin and phenol resin. Methods for forming the insulating layer include immersing the composite particles in a resin solution in which resin is soluble in a dissolving medium such as solvent or water, and spray atomizing the composite particles with a resin solution. Further, from the standpoint of gaining an insulating property without losing thermal conductivity, the thickness of the insulating layer is preferably 1 µm or less.

Covering the surfaces of the composite particles with an insulating layer increases the binding force between the magnetic particles and thermal conductive particles. This in turn suppresses separation of the thermal conductive particles and magnetic particles in a raw material mixing process using mechanical stirring and high-pressure injection, a high-pressure foaming process, and other processes. If the insulating layer is formed of a resin having a hydroxyl group such as epoxy resin or phenol resin, improved adhesiveness is achieved between the polyurethane foam of the base material and the composite particles. Thus, the composite particles (thermal conductive filler) are less susceptible to separating from the base material, and a good oriented state can be maintained. In addition, improving the adhesiveness between the base material and the composite particles can also have an effect of improved physical properties such as tensile strength and elongation of the urethane foam molded product.

The amount of thermal conductive filler (composite particles) mixed in the urethane foam molded product should be determined in consideration of an effect on improving thermal conductivity and an influence on a foam reaction. For example, in order to obtain a urethane foam molded product with desired physical properties but without interfering with the foam reaction, the thermal conductive filler is preferably mixed in an amount of 10 vol % or less, and more preferably 5 vol % or less, when the volume of the urethane foam molded product is 100 vol %. Meanwhile, in order to obtain an effect of improved thermal conductivity, the thermal conductive filler is preferably mixed in an amount of 0.5 vol % or more, and more preferably 1 vol % or more.

<Method for Producing Urethane Foam Molded Product>

A method for producing a urethane foam molded product according to the present invention includes a raw material mixing process and a foam molding process. These processes will be explained below.

(1) Raw Material Mixing Process

The present process obtains a mixed raw material by mixing together a foam urethane resin material and a thermal conductive filler.

The foam urethane resin material may be prepared from any commonly known existing raw material such as a polyol and a polyisocyanate. The polyol may be selected as appropriate from the following: polyvalent hydroxy compounds, polyether polyols, polyester polyols, polymer polyols, polyether polyamines, polyester polyamines, alkylene polyols, urea-dispersed polyols, melamine-modified polyols, polycarbonate polyols, acrylic polyols, polybutadiene polyols, and phenol-modified polyols. The polyisocyanate may be selected as appropriate, for example, from the following: tolylene diisocyanate, phenylene diisocyanate, xylylene diisocyanate, diphenylmethane diisocyanate, triphenylmethane triisocyanate, polymethylene polyphenyl isocyanate, naphthalene diisocyanate, and derivatives of these (e.g., modified polyisocyanates and prepolymers obtained through a reaction with polyols).

The foam urethane resin material may further include a catalyst, a foaming agent, a foam stabilizer, a plasticizer, a cross-linking agent, a flame retardant, an antistatic agent, a viscosity reducing agent, a stabilizer, a filler, and a colorant. Examples of a catalyst include amine catalysts such as tetraethylene diamine, triethylene diamine, and dimethyl ethanolamine, as well as organometallic catalysts such as tin laurate and tin octanoate. Water is well-suited as the foaming agent. Besides water, methylene chloride, chlorofluorocarbons, and carbon dioxide gas are also examples of foaming agents. In addition, a silicone-based foam stabilizer is well-suited as the foam stabilizer, and triethanolamine or diethanolamine are well-suited as the cross-linking agent.

The composition and mixing amount of thermal conductive filler was explained in the above description of the foam urethane molded product of the present invention, and will not be described further here.

The mixed raw material can be produced, for example, by mechanically stirring the foam urethane resin material and the thermal conductive filler using a propeller or the like. Alternatively, the mixed raw material may be produced by adding the thermal conductive filler to at least one of two components (a polyol raw material and a polyisocyanate raw material) of the foam urethane resin material to prepare the two types of raw materials, and then mixing both together. In the case of the latter, the present process may be formed, for example, from a raw material preparation process and a mixing process. In the raw material preparation process, a polyol raw material that includes a polyol, a catalyst, and a foaming agent, and a polyisocyanate raw material that includes a polyisocyanate are prepared as the foam urethane resin material. Then, the thermal conductive filler is mixed with at least one of the polyol raw material and the polyisocyanate raw material. In the mixing process, the polyol raw material and the polyisocyanate raw material are each fed under pressure and supplied to a mixing head. The raw materials are then mixed inside the mixing head to obtain the mixed raw material.

According to the present configuration, an impact stirring method can be employed that mixes the polyol raw material and the polyisocyanate raw material inside the mixing head by injecting and impacting each of the raw materials at high pressure. Using the impact stirring method enables continuous production. Thus, the impact stirring method is well-suited for mass production. According to the impact stirring method, unlike a mechanical stirring method, there is no need for a vessel washing process that is required per mix, which improves the yield ratio. Therefore, the production cost can be reduced.

With the impact stirring method, the polyol raw material that is pre-mixed with the thermal conductive filler, and the polyisocyanate raw material are each injected and impacted at high pressure through an injection hole provided in a mixing head of a high-pressure foaming device. If the size of the thermal conductive filler is larger than the diameter of the injection hole, the injection hole becomes more susceptible to damage from contact with the thermal conductive filler. This may lower the durability of the mixing head. However, a larger-sized thermal conductive filler increases a tendency of the thermal conductive filler to settle in the polyol raw material or the like. This makes uniform mixing difficult. Consequently, if the impact stirring method is employed, the maximum length of the thermal conductive filler is preferably smaller than the diameter of the injection hole through which the polyol raw material and the polyisocyanate raw material are injected. Thus, the load on the mixing head can be reduced, and the life of the high-pressure foaming device can be lengthened. In addition, settling of the thermal conductive filler can be suppressed, and an increase in the viscosity of the polyol raw material and the like can also be reduced. For example, the maximum length of the thermal conductive filler is preferably 500 μm or less.

(2) Foam Molding Process

In the present process, the mixed raw material obtained in the previous raw material mixing process is injected into a cavity of a foaming die to undergo foam molding while a magnetic field is applied so as to substantially uniform a magnetic flux density inside the cavity.

The magnetic field is not limited in any manner provided that the magnetic field is formed in a direction in which to orient the thermal conductive filler. For example, to linearly orient the thermal conductive filler, magnetic field lines inside the cavity of the foaming die are preferably formed so as to be substantially parallel and facing from one end of the cavity toward the other end. In order to form the magnetic field in this manner, magnets may be disposed near the surfaces of the one end and the other end of the foaming die, for example. Permanent magnets or electromagnets should be used for the magnets. Using electromagnets makes it possible to instantaneously switch on and off the formation of the magnetic field, and facilitates a control of the magnetic field strength. Thus, the foam molding can be easily controlled.

The magnetic field lines configuring the magnetic field preferably form a closed loop. Thus, leakage of the magnetic field lines can be suppressed, and a stable magnetic field can be formed inside the cavity. Note that, to form the magnetic field inside the foaming die using magnets disposed outside the foaming die, a material with low magnetic permeability, that is, a nonmagnetic material, may be used for the foaming die. For example, a foaming die made of aluminum or an aluminum alloy normally used for polyurethane foam molding is acceptable. This type of foaming die is less susceptible to the influence of the magnetic field and magnetic field lines generated from a magnetic source such as a magnet, and the magnetic field state is easy to control. However, a foaming die formed from a magnetic material may be used as appropriate depending on the required state of the magnetic field and magnetic field lines.

In the present process, the magnetic field is formed such that the magnetic flux density inside the cavity is substantially uniform. For example, the difference in magnetic flux density inside the cavity may be within ±10%, preferably within ±5%, and more preferably within ±3%. Forming a uniform magnetic field inside the cavity of the foaming die can suppress unevenly distributing of the thermal conductive filler and achieve a desired oriented state. In addition, the foam molding may be performed under a magnetic flux density ranging from 150 mT to 350 mT. Thus, the thermal conductive filler within the mixed raw material can be surely oriented.

The magnetic field is preferably applied while the viscosity of the foam urethane resin material is relatively low. If the magnetic field is applied after the foam molding has finished to a certain extent and the viscosity of the foam urethane resin material has increased, the thermal conductive filler has less tendency to orient itself and obtaining a desired thermal conductivity thus becomes more difficult. Note that there is no need to apply the magnetic field throughout the entire foam molding process.

Once the foam molding ends in the present process, the urethane foam molded product of the present invention is obtained after removal from the die. At such time, depending on the method of foam molding, a surface layer is formed on at least one of the one end and the other end of the urethane foam molded product. The surface layer may be removed depending on the application (obviously, the surface layer may be left attached as well).

EXAMPLES

Next, the present invention will be described in detail using examples.

(1) Thermal Conductivity

<Production of Composite Particles>

Two types of composite particles were produced as follows. First, a natural graphite powder acting as the thermal conductive particles ("F#2" made by Nippon Graphite Industries, Ltd.; flake form; average particle size: 130 μm; thermal conductivity: 250 W/m·K), a stainless steel powder acting as the magnetic particles ("DAP410L" made by Daido Steel Co., Ltd.; SUS410; spherical form; average particle size: 10 μm), and hydroxypropylmethyl cellulose acting as a binder ("TC-5" made by Shin-Etsu Chemical Co., Ltd.) were prepared. Next, the natural graphite powder, the stainless steel powder, and the hydroxypropylmethyl cellulose were charged to a vessel of a high-speed stirring type of mixer and granulator ("NMG-1L" made by Nara Machinery Co., Ltd.) and mixed for approximately 3 minutes. The mixing ratio of natural graphite powder to stainless steel powder was a volume ratio of 6:4. The mixing ratio of hydroxypropylmethyl cellulose was 2 mass % when the total mass of the natural graphite powder and the stainless steel powder was 100 mass %. Water was then added and the composition was further mixed for 20 minutes. After drying the obtained powder, the powder was screened using a sieve with 500 μm openings to recover particles whose maximum length was 500 μm or less. Thus, the composite particles of Example 1 were produced.

Other than changing to a flattened powder (flake form; average particle size: 20 μm) as follows, the stainless steel powder acting as the magnetic particles was prepared in the same manner as described above to produce the composite particles of Example 2. That is, a planetary ball mill ("Planet-M" made by Gokin Planetaring, Inc.) was filled with the stainless steel powder (same as above) and zirconia balls having a 5-mm diameter, and processing was performed for 1 hour at 300 rpm.

Figure 1:
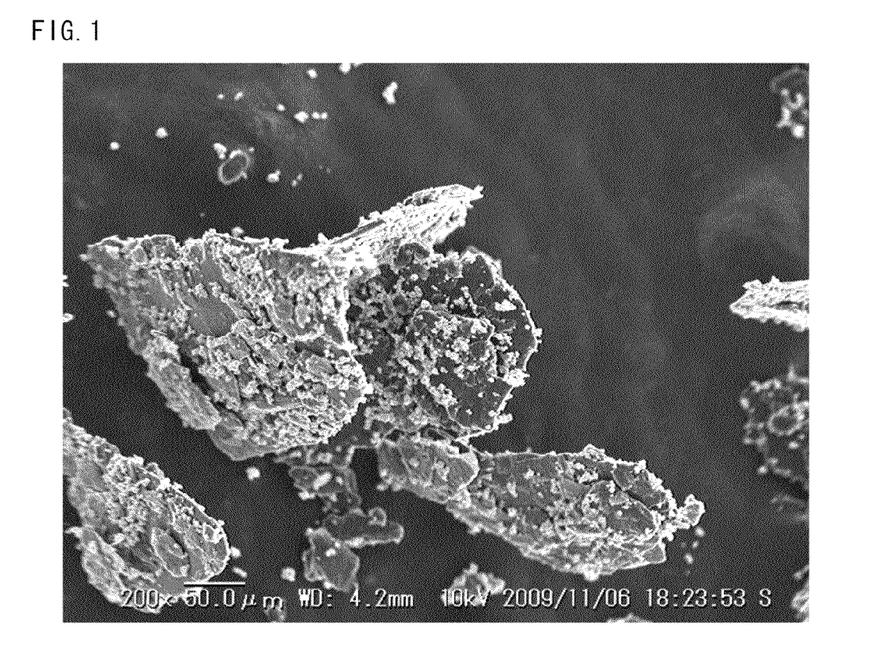
FIG. 1 is an SEM photo of composite particles of Example 1 (magnification: 200×).
Figure 2:
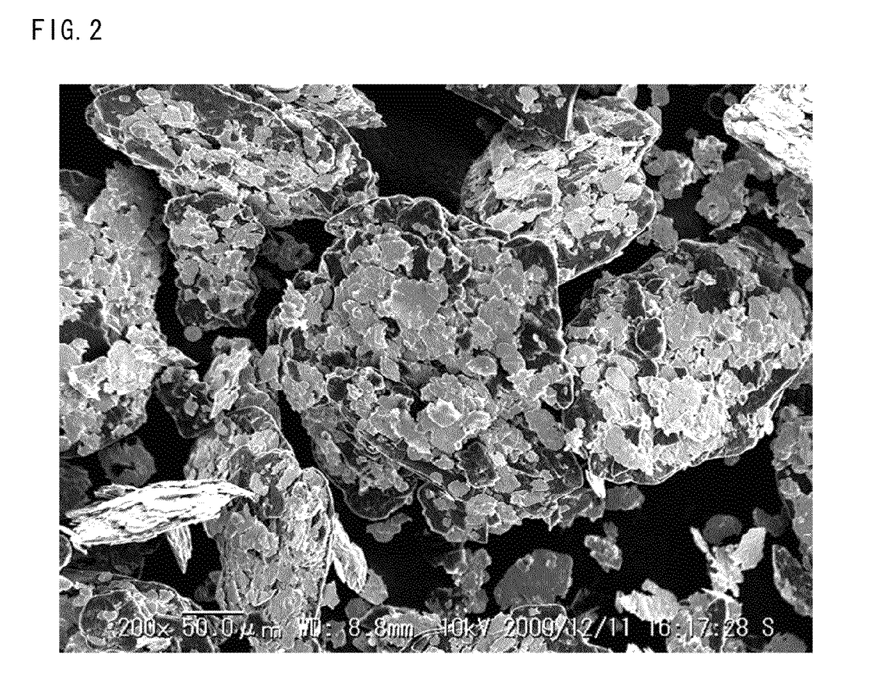
FIG. 2 is an SEM photo of composite particles of Example 2 (magnification: 200×).

The produced composite particles of Examples 1 and 2 were observed using a scanning electron microscope (SEM). FIG. 1 shows an SEM photo of the composite particles of Example 1 (magnification: 200×). FIG. 2 shows an SEM photo of the composite particles of Example 2 (magnification: 200×). As shown in FIGS. 1 and 2, it was confirmed that both types of composite particles have stainless steel particles adhered to the surfaces of natural graphite particles.

Production of Urethane Foam Molded Product

Examples 1 and 2

The two types of composite particles produced were each mixed as a thermal conductive filler to produce urethane foam molded products. First, the foam urethane resin material was prepared as follows. The polyol raw material was prepared by mixing 100 parts by mass of polyether polyol ("S-0248" made by Sumika Bayer Urethane Co., Ltd.; average molecular weight: 6000; functional groups: 3; OH value: 28 mg KOH/g) acting as a polyol component, 2 parts by mass of diethylene glycol (made by Mitsubishi Chemical Corporation) acting as a cross-linking agent, 2 parts by mass of water acting as a foaming agent, 1 part by mass of a tetraethylene diamine catalyst (Kaolizer (registered trademark) No. 31 made by Kao Corporation), and 0.5 parts by mass of a silicone-based foam stabilizer ("SZ-1313" made by Dow Corning Toray Co., Ltd.). Diphenylmethane diisocyanate (MDI) ("NE 1320B" made by BASF INOAC Polyurethanes Ltd.; NCO=44.8 wt %) acting as a polyisocyanate component was added to and mixed with the prepared polyol raw material to obtain the foam urethane resin material. In this case, the mixing ratio (PO:ISO) of the polyol component and the polyisocyanate component was PO:ISO=78.5:21.5, where the total mass of both was 100%.

Next, the composite particles of Examples 1 and 2 were each mixed with the prepared foam urethane resin material, and two types of mixed raw materials prepared. Assuming the volume of the urethane foam molded product to be produced was 100 vol %, the composite particles of Example 1 were mixed to become 3.89 vol % and the composite particles of Example 2 were mixed to become 3.42 vol %.

Figure 3:
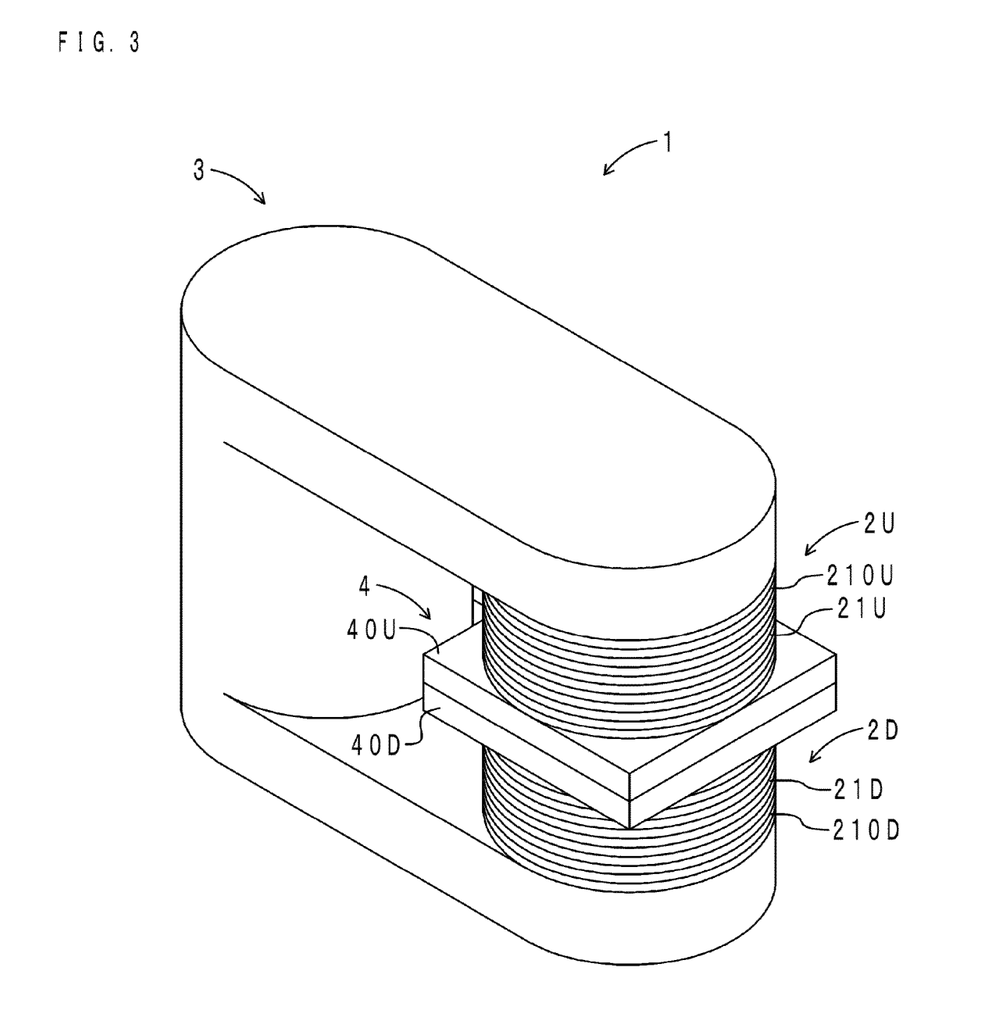
FIG. 3 is a perspective view of a first magnetic induction foam molding device used to produce urethane foam molded products of the examples.
Figure 4:
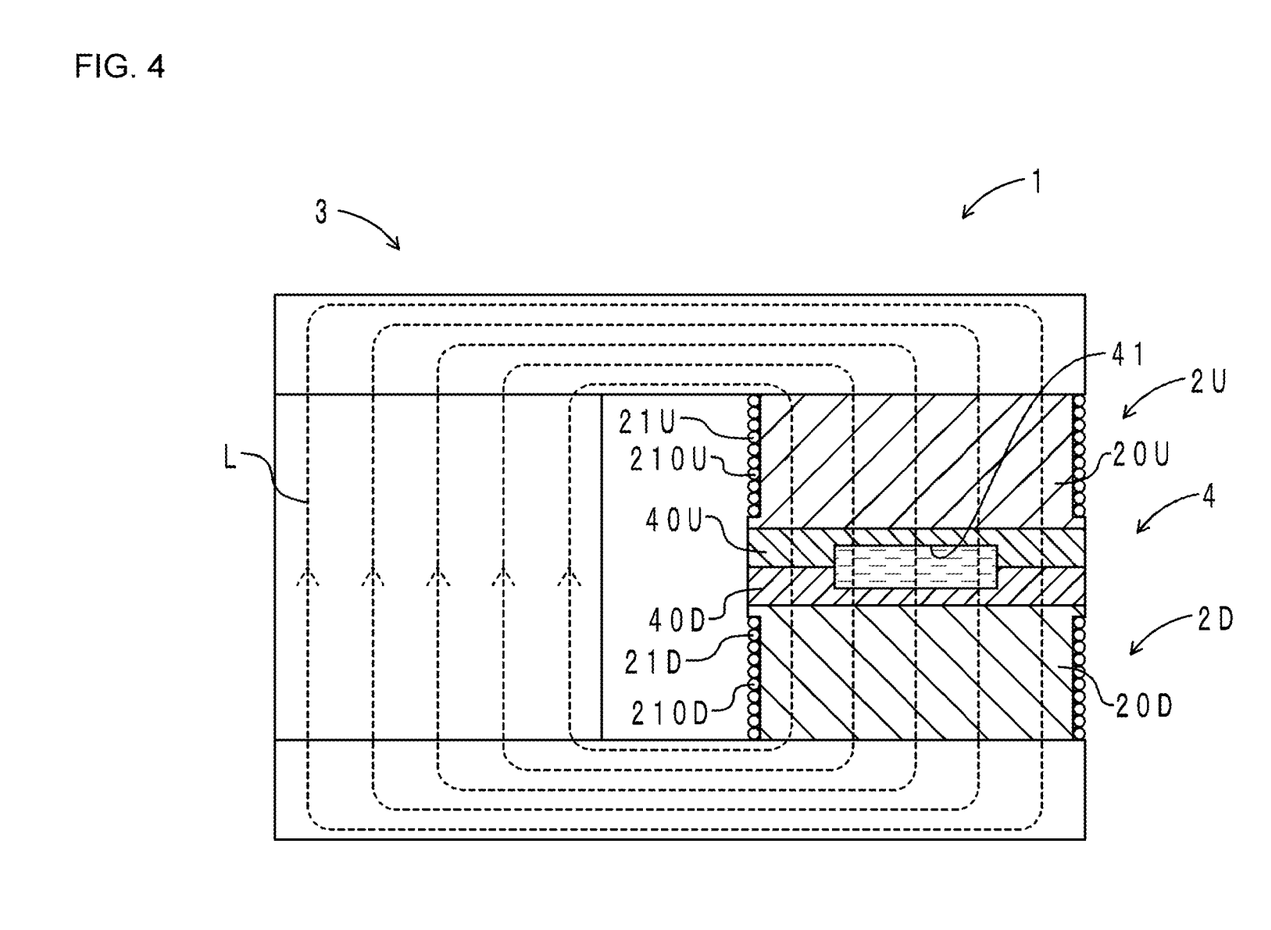
FIG. 4 is a cross-sectional view of the device.

Next, each of the mixed raw materials was injected and sealed in an aluminum foaming die (see FIGS. 3 and 4 described later; cavity: 100 mm (diameter)×20 mm (thickness) cylinder). The foaming die was then mounted in a first magnetic induction foam molding device, and foam molding performed. FIG. 3 shows a perspective view of the first magnetic induction foam molding device. FIG. 4 shows a cross-sectional view of the device. As shown in FIGS. 3 to 4, a first magnetic induction foam molding device 1 includes a pair of electromagnet portions 2U, 2D, and a yoke portion 3.

The electromagnet portion 2U includes a core portion 20U and a coil portion 21U. The core portion 20U is made of a ferromagnetic material and shaped as a cylinder that extends in the up-down direction. The coil portion 21U is disposed on the outer circumferential surface of the core portion 20U. The coil portion 21U is formed by winding a conductor 210U around the outer circumferential surface of the core portion 20U. The conductor 210U is connected to a power source (not shown).

The electromagnet portion 2D is disposed under the electromagnet portion 2U such that the electromagnet portions 2U, 2D sandwich a foaming die 4. The electromagnet portion 2D has the same constitution as the electromagnet portion 2U described above. That is, the electromagnet portion 2D includes a core portion 20D and a coil portion 21D. The coil portion 21D is formed by winding a conductor 210D around the outer circumferential surface of the core portion 20D. The conductor 210D is connected to a power source (not shown).

The yoke portion 3 is shaped as the letter C. The upper end of the C-shaped yoke portion 3 is connected to the upper end of the core portion 20U of the electromagnet portion 2U. Meanwhile, the lower end of the C-shaped yoke portion 3 is connected to the lower end of the core portion 20D of the electromagnet portion 2D.

The foaming die 4 includes an upper die 40U and a lower die 40D. The foaming die 4 is interposed between the core portion 20U of the electromagnet portion 2U and the core portion 20D of the electromagnet portion 2D. The upper die 40U is shaped as a rectangular cylinder. The lower surface of the upper die 40U is formed with a cylindrical recessed portion. The lower die 40D is similarly shaped as a rectangular cylinder. The upper surface of the lower die 40D is formed with a cylindrical recessed portion. The upper die 40U and the lower die 40D are arranged such that the openings of the recessed portions face each other. The recessed portions combine between the upper die 40U and the lower die 40D to define a cavity 41. As described earlier, the cavity 41 is filled with the mixed raw material.

When the power source connected to the conductor 210U and the power source connected to the conductor 210D are turned on, the upper and lower ends of the core portion 20U of the upper electromagnet portion 2U are magnetized to become south and north poles, respectively. Therefore, magnetic field lines L (shown by dashed lines in FIG. 4) heading from top to bottom are generated in the core portion 20U. In addition, the upper and lower ends of the core portion 20D of the lower electromagnet portion 2D are magnetized to becomes south and north poles, respectively. Therefore, the magnetic field lines L heading from top to bottom are generated in the core portion 20D. Further, the lower end of the core portion 20U is a north pole, and the upper end of the core portion 20D is a south pole. Therefore, the magnetic field lines L heading from top to bottom are generated between the core portion 20U and the core portion 20D. As explained earlier, the magnetic field lines L are generated between the electromagnet portions 2U, 2D heading from top to bottom. The magnetic field lines L radiated from the lower end of the core portion 20D of the lower electromagnet portion 2D pass through the yoke portion 3, and flow into the upper end of the core portion 20U of the upper electromagnet portion 2U. Thus, because the magnetic field lines L form a closed loop, leakage of the magnetic field lines L can be suppressed.

As described earlier, the foaming die 4 is interposed between the core portion 20U and the core portion 20D. Therefore, inside the cavity 41 of the foaming die 4, a uniform magnetic field is formed by the substantially parallel magnetic field lines L heading from top to bottom. Specifically, the magnetic flux density inside the cavity 41 was approximately 200 mT. The difference in magnetic flux density inside the cavity 41 was within ±3%. After mounting the foaming die 4 in the first magnetic induction foam molding device 1, for the first approximately 2 minutes, foam molding was performed while applying the magnetic field. For the next approximately 5 minutes, foam molding was performed without applying the magnetic field. Once the foam molding ended, a cylindrical urethane foam molded product was obtained after removal from the die. The obtained urethane foam molded products were corresponded to the number of the composite particles (thermal conductive filler) and used as the urethane foam molded products of Examples 1 and 2. Visual observation of the cross sections of both urethane foam molded products confirmed that the thermal conductive filler was oriented and mutual connections formed.

Comparative Example

A urethane foam molded product was produced in the same manner as Examples 1 and 2 above, except that the natural graphite powder (thermal conductive particles) and the stainless steel powder (spherical magnetic particles) used in the production of the composite particles of Example 1 did not form a compound, and were each mixed separately. Assuming the volume of the urethane foam molded product to be produced was 100 vol %, the natural graphite powder was mixed to become 2.34 vol % and the stainless steel powder was mixed to become 1.78 vol %. The obtained urethane foam molded product was used as the urethane foam molded product of a comparative example.

<Thermal Conductivity Measurement>

Figure 5:
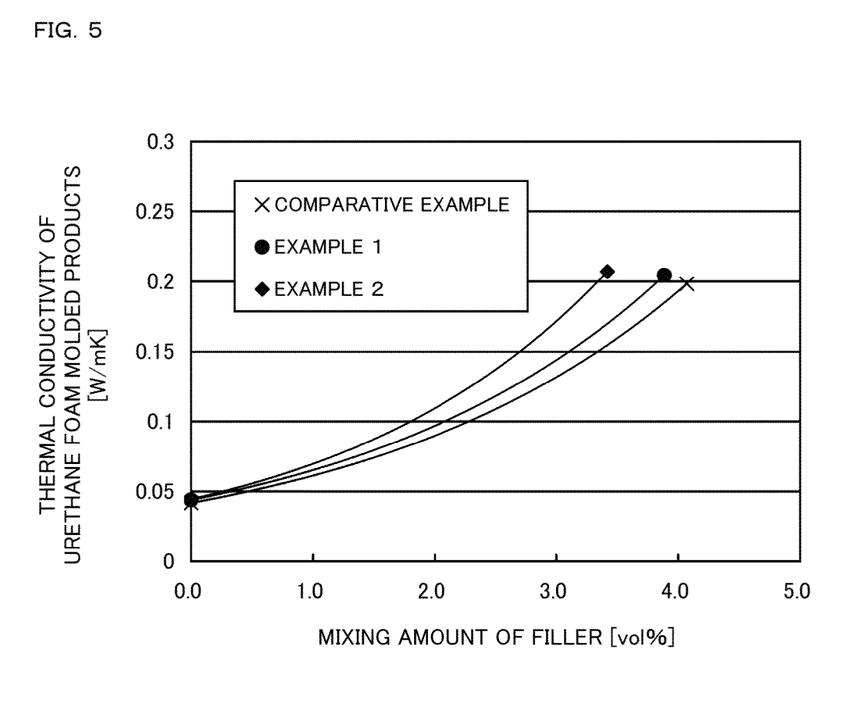
FIG. 5 is a graph that shows measurement results of the thermal conductivity of the urethane foam molded products of Examples 1 and 2, and a comparative example.

The thermal conductivity of the produced urethane foam molded products of Examples 1 and 2, and the comparative example was measured. The thermal conductivity was measured according to a hot wire method (probe method) based on JIS R2616 (2011). The measurement used "QTM-D3" made by Kyoto Electronics Manufacturing Co., Ltd. FIG. 5 shows the thermal conductivity measurement results of each urethane foam molded product. In FIG. 5, each curve is an approximate curve that connects the thermal conductivity (approximately 0.04 W/mK) of the urethane foam molded product that does not contain filler (mixing amount: 0 vol %), and the thermal conductivity of the urethane foam molded products of the examples. The thermal conductivity of the urethane foam molded products was 0.204 W/mK (mixing amount of thermal conductive filler: 3.89 vol %) for Example 1, 0.207 W/mK (mixing amount of thermal conductive filler: 3.42 vol %) for Example 2, and 0.198 W/mK for the comparative example (total mixing amount of natural graphite powder and stainless steel powder: 4.12 vol %).

In a comparison of identical mixing amounts of filler, as shown in FIG. 5, the thermal conductivity of the urethane foam molded products of Examples 1 and 2 is greater than the thermal conductivity of the urethane foam molded product of the comparative example. In other words, according to the urethane foam molded products of Examples 1 and 2, the thermal conductivity can be improved using a smaller amount of filler. In particular, according to the urethane foam molded product of Example 2, which uses flake magnetic particles in its composite particles, the thermal conductivity increased despite the small mixing amount of thermal conductive filler. This is due to the improved thermal conductivity between adjacent composite particles, which is achieved by the larger contact surface area between the magnetic particles and the thermal conductive particles, and the shorter distance between adjacent thermal conductive particles.

(2) Flame Retardancy

<Production of Composite Particles>

Four types of composite particles A to D were produced as follows.

[Composite Particles A]

Composite particles were produced using expanded graphite powder ("SYZR502FP" purchased from Sanyo Trading Co., Ltd.) and natural graphite powder (same as above) as the thermal conductive particles, and using stainless steel powder (same as above) as the magnetic particles. First, the expanded graphite powder, the natural graphite powder, the stainless steel powder, and the hydroxypropylmethyl cellulose (same as above) were charged to the vessel of the high-speed stirring type of mixer and granulator (same as above) and mixed for approximately 3 minutes. Next, water was added and the composition was further mixed for 20 minutes. The obtained powder was then dried to obtain the composite particles A. Note that the mixing ratio of the materials used is shown in Table 1 below (which also shows the mixing ratios for the following composite particles B to D).

[Composite Particles B]

The composite particles B were produced in the same manner as the composite particles A described above, except for changes to the mixing ratios of the magnetic particles and the binder.

[Composite Particles C]

The composite particles C were produced without using expanded graphite powder. In other words, the composite particles C were produced in the same manner as the composite particles A described above using natural graphite powder, stainless steel powder, and a binder. The composite particles C are identical to the composite particles of Example 1 described above in that expanded graphite particles are not included as the thermal conductive particles.

[Composite Particles D]

The composite particles D were produced without using natural graphite powder. In other words, the composite particles D were produced in the same manner as the composite particles A described above using expanded graphite powder, stainless steel powder, and a binder.

TABLE 1

| Raw Materials | | Composite particles A | Composite particles B | Composite particles C | Composite particles D |
|---|---|---|---|---|---|
| | | | | | (parts by mass) |
| Magnetic particles | Stainless steel powder | 200 | 175 | 200 | 200 |
| Thermal conductive particles | Natural graphite powder | 50 | 50 | 100 | 0 |
| | Expanded graphite powder | 50 | 50 | 0 | 100 |
| Binder | Hydroxypropylmethly cellulose | 6 | 5.5 | 6 | 6 |

Production of Urethane Foam Molded Product

Example 3

The composite particles A produced were used as a thermal conductive filler to produce a urethane foam molded product.

The composite particles A contained 50% by mass of particles using expanded graphite particles as thermal conductive particles and 50% by mass of particles using natural graphite particles as thermal conductive particles. First, the polyol raw material was prepared by mixing 100 parts by mass of polyether polyol (same as above), 2 parts by mass of diethylene glycol (same as above) acting as a cross-linking agent, 2 parts by mass of water acting as a foaming agent, 1.5 parts by mass of a tetraethylene diamine catalyst (same as above), and 0.5 parts by mass of a silicone-based foam stabilizer (same as above). Diphenylmethane diisocyanate (MDI) (same as above) was prepared as the polyisocyanate material.

Next, 129.7 parts by mass of the composite particles A were added to and mixed with 100 parts by mass of the polyol raw material to prepare a pre-mixed polyol. Then, 100.6 grams of the pre-mixed polyol and 13.7 grams of the polyisocyanate raw material were mixed together to obtain the mixed raw material.

Figure 6:
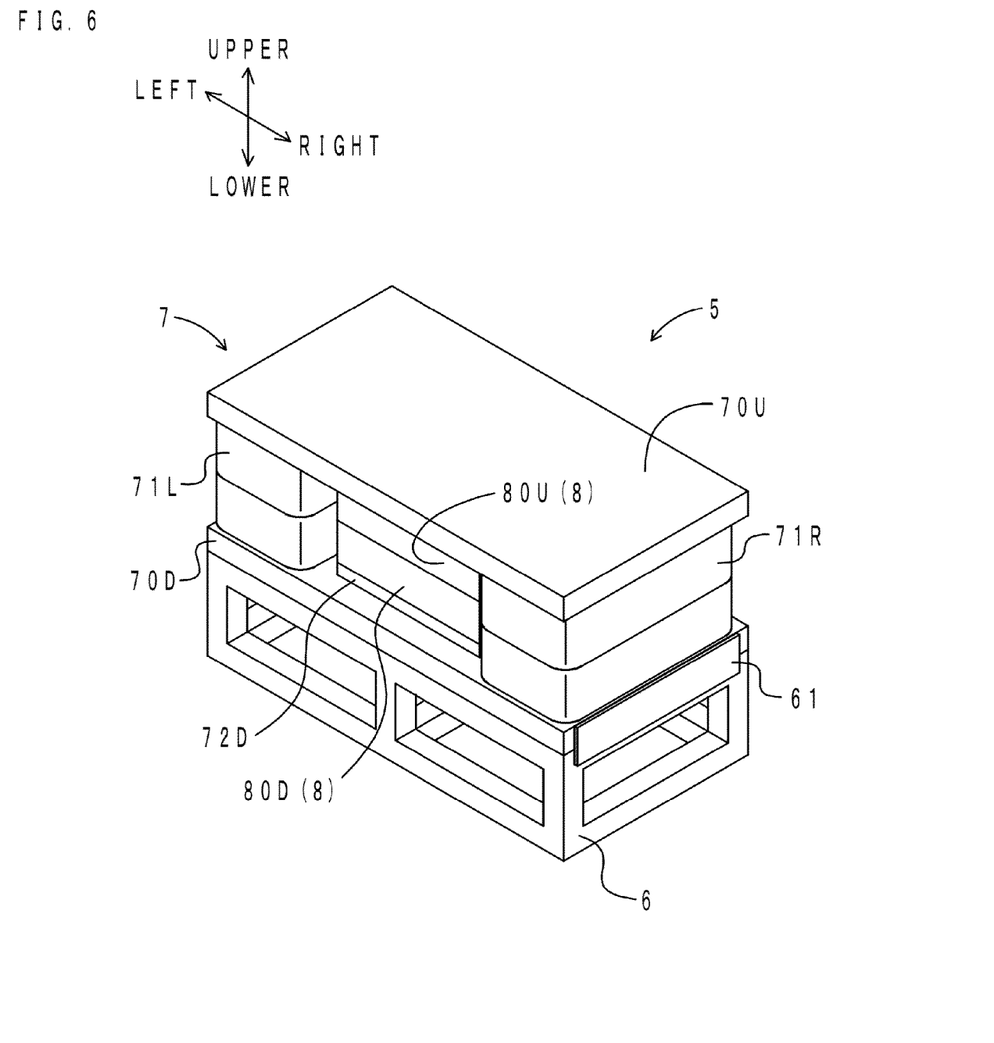
FIG. 6 is a perspective view of a second magnetic induction foam molding device used to produce urethane foam molded products of the examples.
Figure 7:
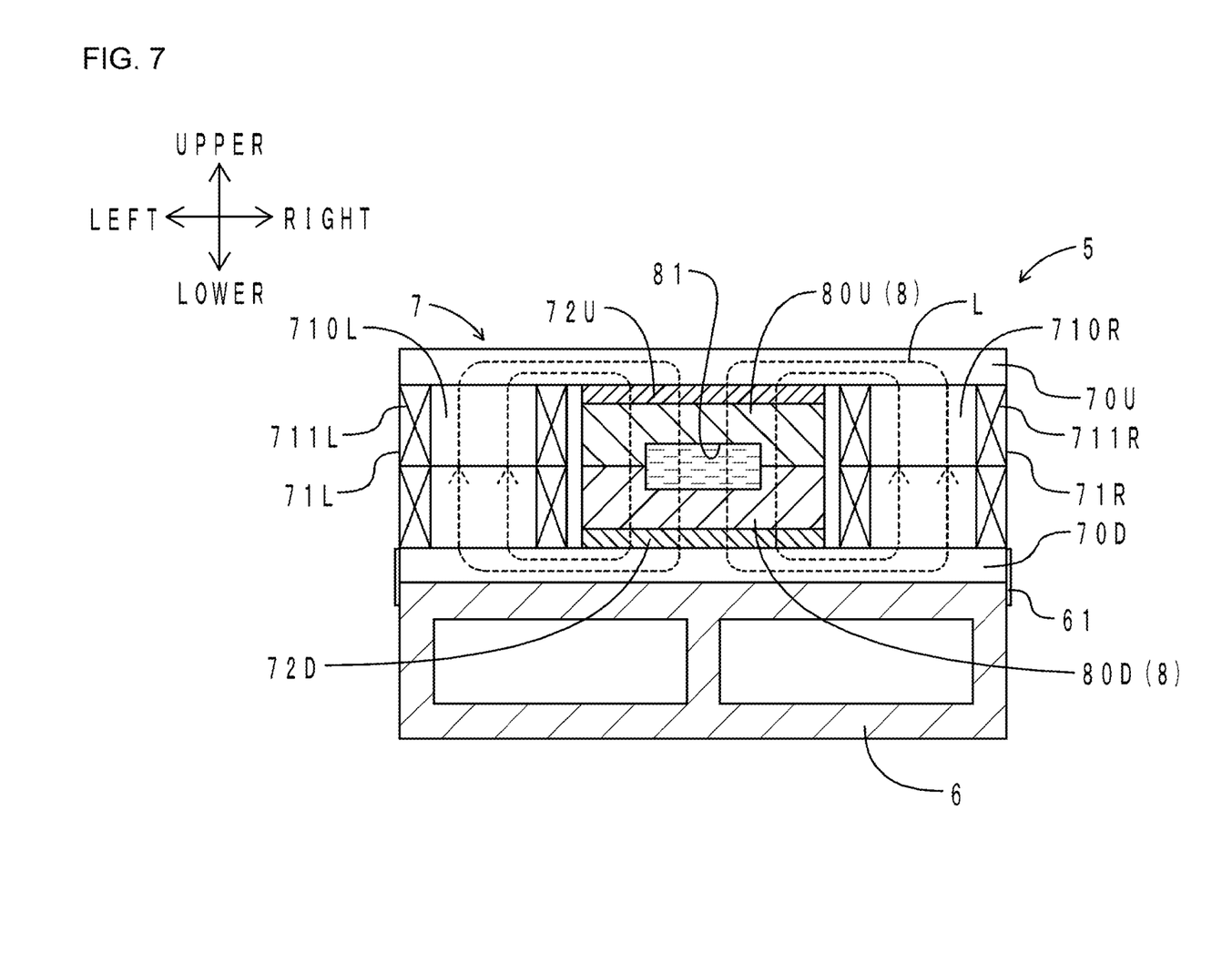
FIG. 7 is a cross-sectional view of the device.

Thereafter, the mixed raw material was injected into the aluminum foaming die (see FIGS. 6 and 7 described later; cavity: 130 mm (vertical)×130 mm (horizontal)×20 mm (thickness) rectangular parallelepiped), and the foaming die sealed. The foaming die was then mounted in a second magnetic induction foam molding device, and foam molding performed. FIG. 6 shows a perspective view of the second magnetic induction foam molding device. FIG. 7 shows a cross-sectional view of the device. In FIG. 7, hatching of the yoke portion and the core portion is omitted for convenience. As shown in FIGS. 6 to 7, a second magnetic induction foam molding device 5 includes a mount 6, an electromagnet portion 7, and a foaming die 8.

The electromagnet portion 7 is installed on the upper surface of the mount 6. The electromagnet portion 7 and the mount 6 are each fixed by threadedly fastening a bracket 61. The electromagnet portion 7 includes yoke portions 70U, 70D, coil portions 71L, 71R, and pole pieces 72U, 72D.

The yoke portion 70U is made of iron and shaped as a flat plate. The yoke portion 70D is similarly made of iron and shaped as a flat plate. The yoke portions 70U, 70D are disposed facing each other in the up-down direction.

The coil portion 71L is interposed between the yoke portions 70U, 70D. The coil portion 71L is disposed to the left of the foaming die 8. The coil portion 71L is arranged as two portions overlapping in the up-down direction. Each of the coil portions 71L includes a core portion 710L and a conductor 711L. The core portion 710L is made of iron and shaped as a column that extends in the up-down direction. The conductor 711L is wound around the outer circumferential surface of the core portion 710L. The conductor 711L is connected to a power source (not shown).

The coil portion 71R is interposed between the yoke portions 70U, 70D. The coil portion 71R is disposed to the right of the foaming die 8. The coil portion 71R is arranged as two portions overlapping in the up-down direction. Each of the coil portions 71R is configured similar to the coil portion 71L. That is, the coil portion 71R includes a core portion 710R and a conductor 711R. The conductor 711R is wound around the outer circumferential surface of the core portion 710R. The conductor 711R is connected to a power source (not shown).

The pole piece 72U is made of iron and shaped as a flat plate. The pole piece 72U is centrally disposed on the lower surface of the yoke portion 70U. The pole piece 72U is interposed between the yoke portion 70U and the foaming die 8. The pole piece 72D is made of iron and shaped as a flat plate. The pole piece 72D is centrally disposed on the upper surface of the yoke portion 70D. The pole piece 72D is interposed between the yoke portion 70D and the foaming die 8.

The foaming die 8 is disposed between the coil portion 71L and the coil portion 71R. The foaming die 8 includes an upper die 80U and a lower die 80D. The upper die 80U is shaped as a rectangular cylinder. The lower surface of the upper die 80U is formed with a recessed portion. The lower die 80D is similarly shaped as a rectangular cylinder. The upper surface of the lower die 80D is formed with a recessed portion. The upper die 80U and the lower die 80D are arranged such that the openings of the recessed portions face each other. The recessed portions combine between the upper die 80U and the lower die 80D to define a cavity 81 having a rectangular parallelepiped shape. As described earlier, the cavity 81 is filled with the mixed raw material.

When the power source connected to the conductor 711L and the power source connected to the conductor 711R are turned on, the upper and lower ends of the core portion 710L of the coil portion 71L are magnetized to become north and south poles, respectively. Therefore, the magnetic field lines L (shown by dashed lines in FIG. 7) heading from bottom to top are generated in the core portion 710L. Similarly, the upper and lower ends of the core portion 710R of the coil portion 71R are magnetized to becomes north and south poles, respectively. Therefore, the magnetic field lines L heading from bottom to top are generated in the core portion 710R.

The magnetic field lines L radiated from the upper end of the core portion 710L of the coil portion 71L pass through the yoke portion 70U and the pole piece 72U, and flow into the cavity 81 of the foaming die 8. The magnetic field lines L subsequently pass through the pole piece 72D and the yoke portion 70D, and flow into the lower end of the core portion 710L. Likewise, the magnetic field lines L radiated from the upper end of the core portion 710R of the coil portion 71R pass through the yoke portion 70U and the pole piece 72U, and flow into the cavity 81 of the foaming die 8. The magnetic field lines L subsequently pass through the pole piece 72D and the yoke portion 70D, and flow into the lower end of the core portion 710R. Thus, because the magnetic field lines L form a closed loop, leakage of the magnetic field lines L is suppressed. Moreover, inside the cavity 81 of the foaming die 8, a uniform magnetic field is formed by the substantially parallel magnetic field lines L heading from top to bottom. Specifically, the magnetic flux density inside the cavity 81 was approximately 200 mT. The difference in magnetic flux density inside the cavity 81 was within ±3%.

The foam molding was performed while applying the magnetic field for the first approximately 2 minutes, and then not applying the magnetic field for the next approximately 5 minutes. Once the foam molding ended, a urethane foam molded product was obtained after removal from the die. The obtained urethane foam molded product was used as the urethane foam molded product of Example 3. In the urethane foam molded product of Example 3, the mixing amount of thermal conductive filler (composite particles A) was 4 vol % when the volume of the urethane foam molded product was 100 vol %.

Example 4

The composite particles B produced were used as a thermal conductive filler to produce a urethane foam molded product. The composite particles B contained 50% by mass of particles using expanded graphite particles as thermal conductive particles and 50% by mass of particles using natural graphite particles as thermal conductive particles. First, 261.5 parts by mass of the composite particles B and 20 parts by mass of plasticizer were added to and mixed with 100 parts by mass of the polyol raw material used in Example 3 to prepare the pre-mixed polyol. Next, 381 grams of the pre-mixed polyol and 15.1 grams of the polyisocyanate raw material used in Example 3 were mixed together to obtain the mixed raw material. Then, the mixed raw material was injected into the foaming die (same as above) and the foaming die sealed, after which foam molding was performed within a magnetic field similar to Example 3. The obtained urethane foam molded product was used as the urethane foam molded product of Example 4. In the urethane foam molded product of Example 4, the mixing amount of thermal conductive filler (composite particles B) was 19.3 vol % when the volume of the urethane foam molded product was 100 vol %.

Example 5

The composite particles D produced were used as a thermal conductive filler to produce a urethane foam molded product. The thermal conductive particles forming the composite particles D were all expanded graphite particles. First, 129.7 parts by mass of the composite particles D were added to and mixed with 100 parts by mass of the polyol raw material used in Example 3 to prepare the pre-mixed polyol. Next, 100.6 grams of the pre-mixed polyol and 13.7 grams of the polyisocyanate raw material used in Example 3 were mixed together to obtain the mixed raw material. Then, the mixed raw material was injected into the foaming die (same as above) and the foaming die sealed, after which foam molding was performed within a magnetic field similar to Example 3. The obtained urethane foam molded product was used as the urethane foam molded product of Example 5. In the urethane foam molded product of Example 5, the mixing amount of thermal conductive filler (composite particles D) was 4 vol % when the volume of the urethane foam molded product was 100 vol %.

Reference Example

The composite particles C produced were used as a thermal conductive filler to produce a urethane foam molded product. The thermal conductive particles forming the composite particles C were all natural graphite particles. First, 129.7 parts by mass of the composite particles C were added to and mixed with 100 parts by mass of the polyol raw material used in Example 3 to prepare the pre-mixed polyol. Next, 100.6 grams of the pre-mixed polyol and 13.7 grams of the polyisocyanate raw material used in Example 3 were mixed together to obtain the mixed raw material. Then, the mixed raw material was injected into the foaming die (same as above) and the foaming die sealed, after which foam molding was performed within a magnetic field similar to Example 3. The obtained urethane foam molded product was used as the urethane foam molded product of a reference example. In the urethane foam molded product of the reference example, the mixing amount of thermal conductive filler (composite particles C) was 4 vol % when the volume of the urethane foam molded product was 100 vol %.

<Evaluation of Flame Retardancy>

The flame retardancy of the urethane foam molded products of the examples and the reference example was evaluated. The evaluation of flame retardancy was performed based on burning test standards (UL 94) set forth by Underwriters Laboratories, Inc. in the United States of America. The flame retardancy was evaluated as satisfactory if the V-0 criteria was met (indicated by a circle in Table 2), and not satisfactory if the V-0 criteria was not met (indicated by a cross in Table 2). The evaluation results are shown in Table 2 together with the amount of raw materials contained in each urethane foam molded product.

TABLE 2

| Raw materials | | Example 3 | Example 4 | Example 5 | Reference example |
|---|---|---|---|---|---|
| Pre-mixed polyol (parts by mass) | Polyol raw material | 100 | 100 | 100 | 100 |
| | Composite particles A | 129.7 | — | — | — |
| | Composite particles B | — | 261.5 | — | — |
| | Composite particles C | — | — | — | 129.7 |
| | Composite particles D | — | — | 129.7 | — |
| | Plasticizer | — | 20 | — | — |
| Pre-mixed polyol (g)/ polyisocyanate raw material (g) | | 100.6/ 13.7 | 381/ 15.1 | 100.6/ 13.7 | 100.6/ 13.7 |
| Thermal conductive filler amount (vol %) | | 4 | 19.3 | 4 | 4 |
| Flame retardancy [UL 94, V-0] | | ○ | ○ | ○ | X |

The urethane foam molded products of the examples cleared the V-0 criteria of UL 94, as shown in Table 2. However, the urethane foam molded product of the reference example that does not include expanded graphite particles as the thermal conductive particles did not achieve the flame retardancy of the V-0 criteria. It was thus confirmed that, if expanded graphite particles are used as the thermal conductive particles, the urethane foam molded product of the present invention has excellent flame retardancy even if magnetic particles are included.

INDUSTRIAL APPLICABILITY

The urethane foam molded product of the present invention may be used in a wide variety of fields, such as the automotive, electronic, and construction fields. The urethane foam molded product of the present invention may also be used in applications that require high flame retardancy in addition to a heat dissipation property. For example, the urethane foam molded product of the present invention is well-suited for use in sound absorbing tires for reducing noise caused by uneven road surfaces, engine covers and side covers placed in vehicle engine compartments for reducing engine noise, material for absorbing the sound of motors in office automation (OA) equipment and household appliances, sound absorption material with a heat dissipation property for electronics such as personal computers, sound absorption material for the inside and outside walls of houses, and vibration absorption material used in the power conditioner reactors of solar power generation systems.

The invention claimed is:

1. A urethane foam molded product, characterized by comprising a base material formed of a polyurethane, and a thermal conductive filler mixed in the base material and oriented to form mutual connections, wherein
   the thermal conductive filler is formed of a composite particle, the composite particle including a thermal conductive particle formed of a nonmagnetic material, and a magnetic particle adhered to a surface of the thermal conductive particle by a water-based binder.

2. The urethane foam molded product according to claim 1, wherein the magnetic particle is shaped as a flake.

3. The urethane foam molded product according to claim 1, wherein the magnetic particle is formed of at least one material selected from the group consisting of iron, nickel, cobalt, and an iron-based alloy thereof.

4. The urethane foam molded product according to claim 1, wherein an average particle size of the magnetic particle is 1 μm or more.

5. The urethane foam molded product according to claim 1, wherein an average particle size of the thermal conductive particle is 500 μm or less.

6. The urethane foam molded product according to claim 1, wherein the composite particle is produced according to an agitation granulation method, and
the thermal conductive particle and the magnetic particle are adhered to each other by a binder.

7. The urethane foam molded product according to claim 1, wherein the thermal conductive particle is formed of graphite.

8. The urethane foam molded product according to claim 7, wherein a volume ratio of the graphite to the magnetic particle in the composite particle is 7:3 to 5:5.

9. The urethane foam molded product according to claim 1, wherein the thermal conductive particle includes an expanded graphite particle.

10. The urethane foam molded product according to claim 9, wherein the thermal conductive particle further includes a graphite particle other than expanded graphite.

11. The urethane foam molded product according to claim 9, wherein the expanded graphite particle is included in an amount of 5 mass % or more when a total mass of the urethane foam molded product is 100 mass %.

12. The urethane foam molded product according to claim 1, wherein a surface of the composite particle is covered by an insulating layer.

13. A method for producing the urethane foam molded product according to claim 1, characterized by comprising:
a raw material mixing process that mixes a foam urethane resin material and a thermal conductive filler to obtain a mixed raw material; and
a foam molding process that injects the mixed raw material into a cavity of a foaming die and performs foam molding while a magnetic field is applied so as to substantially uniform a magnetic flux density inside the cavity.

\* \* \* \* \*